Patented Nov. 4, 1930

1,780,860

UNITED STATES PATENT OFFICE

RUDOLF BERENDES AND LUDWIG SCHÜTZ, OF ELBERFELD, GERMANY, ASSIGNORS TO WINTHROP CHEMICAL COMPANY, INC., OF NEW YORK, N. Y., A CORPORATION OF NEW YORK

BETAINETHIOCYANATE

No Drawing. Application filed June 18, 1928, Serial No. 286,484, and in Germany June 28, 1927.

The present invention relates to the manufacture of betainethiocyanate.

In accordance with the invention betaine thiocyanate is obtained by combining betaine (trimethylglycocoll) with thiocyanic acid or by causing decomposition of betaine salts, especially betaine hydrochloride, with suitable salts of the thiocyanic acid, such as ammonium thiocyanate or alkali metal thiocyanates.

Betaine thiocyanate has valuable advantages over the known compounds of thiocyanic acid used in therapy, since it exerts the pure action of the acid due to the fact that the betaine undergoes complete combustion in the organism and causes a considerable increase in the separation of urea as well as of sodium chloride from the body, which is of value in the case of some diseases.

The following examples will illustrate our invention, without limiting it thereto:

*Example 1.*—135 parts by weight of crystalline betaine or 117 parts by weight of anhydrous betaine are dissolved with stirring in 480 parts by weight of aqueous thiocyanic acid, containing 8.3% of thiocyanic acid. The solution is cooled, whereupon part of the betaine thiocyanate crystallizes out. After filtering from the crystals, the mother liquor is evaporated to a small volume in vacuo at a temperature not exceeding 100° C., cooled and again filtered. By re-crystallization from alcohol or water the betaine thiocyanate is obtained in the form of colorless crystals. The melting point is 167° C. (with decomposition). The process proceeds according to the following equation:

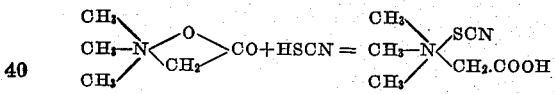

*Example 2.*—76 parts by weight of ammonium thiocyanate are dissolved in 33 parts of hot water and the solution is mixed with a boiling solution of 153.5 parts by weight of betaine hydrochloride in 200 parts of water. After cooling, the betaine thiocyanate which crystallizes out is filtered. The raw product is freed from any adhering small quantities of ammonium chloride by washing with alcohol or re-crystallizing from water. The process proceeds according to the following equation:

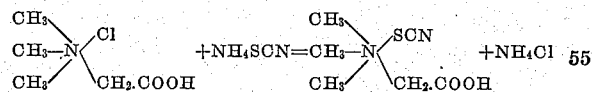

*Example 3.*—76 parts by weight of ammonium thiocyanate are dissolved in 150 parts by weight of hot alcohol and the solution is mixed with a hot solution of 153.5 parts by weight of betaine hydrochloride in 150 parts of water. The betaine thiocyanate crystallizes out on cooling. Purification is effected as described in Example 2.

We claim:

Betaine thiocyanate, forming colorless crystals of the melting point 167° C. (with decomposition) and being a product of great therapeutical value.

In testimony whereof we have hereunto set our hands.

RUDOLF BERENDES. [L. S.]
LUDWIG SCHÜTZ. [L. S.]